(12) United States Patent
Kirksey et al.

(10) Patent No.: US 10,466,069 B1
(45) Date of Patent: Nov. 5, 2019

(54) SYSTEMS AND METHODS FOR OBTAINING WIND INFORMATION (71) Applicants: Charles Kirksey, Nashville, TN (US); Al Garcia, Clarksville, TN (US)

(72) Inventors: Charles Kirksey, Nashville, TN (US); Al Garcia, Clarksville, TN (US)

( * ) Notice: Subject to any disclaimer, the term of this patent is extended or adjusted under 35 U.S.C. 154(b) by 0 days.

(21) Appl. No.: 16/231,459

(22) Filed: Dec. 22, 2018

Related U.S. Application Data (60) Provisional application No. 62/751,151, filed on Oct. 26, 2018.

(51) Int. Cl.
G01D 3/028 (2006.01)
G08G 5/00 (2006.01)
G01C 3/04 (2006.01)
G05D 1/08 (2006.01)
B64C 39/02 (2006.01)

(52) U.S. Cl.
CPC .......... *G01D 3/028* (2013.01); *B64C 39/024* (2013.01); *G01C 3/04* (2013.01); *G05D 1/0825* (2013.01); *G08G 5/0091* (2013.01); *B64C 2201/108* (2013.01); *B64C 2201/125* (2013.01)

(58) Field of Classification Search
CPC ................. G01D 3/028; B64C 39/024; B64C 2201/125; B64C 2201/108; G05D 1/0825; G01C 3/04; G08G 5/0091
See application file for complete search history.

(56) References Cited

U.S. PATENT DOCUMENTS

| 4,267,562 A | 5/1981 | Raimondi |
| 5,435,503 A | 7/1995 | Johnson, Jr. et al. |
| 5,631,654 A | 5/1997 | Karr |
| 7,249,730 B1 | 7/2007 | Flippen, Jr. |
| 7,856,750 B2 | 12/2010 | Sammut et al. |
| 8,353,454 B2 | 1/2013 | Sammut et al. |
| 8,729,442 B2 * | 5/2014 | Boelitz ............... G05D 1/105 235/400 |
| 9,347,742 B2 | 5/2016 | Varshneya et al. |
| 9,851,179 B2 | 12/2017 | Volfson |

(Continued)

FOREIGN PATENT DOCUMENTS

WO  20160118665 A1  7/2016

OTHER PUBLICATIONS

X. Xiang et al., "Wind Field Estimation Through Autonomous Quadcopter Avionics," 2016 IEEE/AIAA 35th Digital Avionics Systems Conference (DASC) (2016).

*Primary Examiner* — Jonathan M Dunlap

(74) *Attorney, Agent, or Firm* — Jacob Neu; Bradley Arant Boult Cummings LLP (57) ABSTRACT A system and method for determining the wind force along the planned trajectory of a projectile are disclosed herein. A drone is flown along the expected path of the trajectory along a set heading. The drone is programmed to maintain the heading. As wind forces act upon the drone during its flight, the drone's electronic stability system provides automatic power and directional control to one or more motors that control the rotors and propellers that keep the drone aloft. By monitoring the changes in motor or drone state information over time in response to wind forces, the wind can be determined at various locations along the flight path. This information can be provided to a ballistics calculator to determine the launch heading of the projectile.

14 Claims, 5 Drawing Sheets (56) References Cited

U.S. PATENT DOCUMENTS

| | | | | |
|---|---|---|---|---|
| 9,909,840 B2* | 3/2018 | Volfson | ............... | G01W 1/02 |
| 10,012,667 B2 | 7/2018 | Downs | | |
| 2005/0233815 A1 | 10/2005 | McCreary et al. | | |
| 2010/0314487 A1* | 12/2010 | Boelitz | ............... | G05D 1/105 |
| | | | | 244/3.1 |
| 2010/0314497 A1* | 12/2010 | Boelitz | ............... | B64G 1/002 |
| | | | | 244/158.9 |
| 2012/0048931 A1 | 3/2012 | Arbouw | | |
| 2012/0138681 A1* | 6/2012 | Schneider | ............ | F41C 27/06 |
| | | | | 235/404 |
| 2012/0298750 A1* | 11/2012 | McCarty | ............... | F41G 1/38 |
| | | | | 235/404 |
| 2014/0324348 A1* | 10/2014 | Volfson | ............... | G01W 1/02 |
| | | | | 702/3 |
| 2015/0108215 A1* | 4/2015 | Ehrlich | ............... | G01S 17/88 |
| | | | | 235/404 |
| 2015/0362288 A1 | 12/2015 | Sammut et al. | | |
| 2016/0084617 A1 | 3/2016 | Lyren | | |
| 2016/0293015 A1* | 10/2016 | Bragin | ............... | B64C 39/024 |

* cited by examiner

SYSTEMS AND METHODS FOR OBTAINING WIND INFORMATION

RELATED APPLICATIONS

This application claims the benefit of filing and right of priority to U.S. Provisional Application No. 62/751,151 filed on Oct. 26, 2018.

BACKGROUND OF THE INVENTION

When an unguided (i.e., ballistic) flying object is released toward a particular target, the object's path is largely determined by two forces: gravity and wind. Gravity is a known force, and the only variables needed for determining the effect of gravity are the respective heights of the point of release and the target. The effect of wind forces, however, are much more difficult to determine. The wind force can change direction and speed quickly. Moreover, for objects released on long trajectories, the wind force may vary over the course of the trajectory. Therefore, a person trying to hit a target with the unguided object must ideally account not only for the wind force over time, but also over the range of flight.

Standard ballistic calculators do allow for input regarding the heading and the magnitude of the wind force. However, such wind forces are typically determined manually by the user. When real-time wind force readings are provided by anemometers, these are typically for only one or two locations (usually, the location of release), and the user must estimate the wind force elsewhere along the path, or simply apply the wind force at the known location as if it applied along the entire path.

What is needed, then, is a method of real-time acquisition of wind force data along the entire planned trajectory path of a flying object in order to calculate, in real-time or near-real-time, the ideal release velocity vector (i.e., heading and speed) of the object.

SUMMARY OF THE INVENTION

According to some embodiments disclosed herein is a method for determining launch heading of an object at a launch location to reach a target, having the steps of providing to a processor a range to the target and elevation to the target; flying a drone a first distance on a flight path from the launch location towards the target; obtaining drone state information, the drone state information comprising a measurement of electrical power supplied to each motor of the drone for at least two locations along the flight path; transmitting the drone state information to a processor programmed to correlate drone state information to wind data; calculating wind data from the drone state information, the wind data comprising a wind force vector for the at least two locations along the flight path; setting the launch heading of the object in response to the wind data; and launching the object.

According to other embodiments disclosed herein is a system for determining launch heading of an object to reach a target, having a drone having an electronic speed control system and a first transceiver capable of transmitting information concerning the electronic speed control system; a second transceiver capable of receiving information concerning the electronic speed control system; a processor configured to execute instructions to process the information concerning the electronic speed control system to determine a wind speed and heading for at least two locations along an estimated flight path of the object, and further configured to execute instructions to determine the launch heading using the wind speed and headings for the at least two locations; and a display to output to a user the launch heading.

DETAILED DESCRIPTION OF INVENTION

The described systems and techniques may be performed by a computer system that includes a single computer or more than one computer. A computer may be a processor controlled device, such as, by way of example, personal computers, workstations, servers, clients, mini-computers, main-frame computers, laptop computers, smart phones, tablets, a network of one or more individual computers, mobile computers, portable computers, handheld computers, palm top computers, set top boxes for a TV, interactive televisions, interactive kiosks, personal digital assistants, interactive wireless devices, or any combination thereof.

A computer may be a uniprocessor or multiprocessor machine. Accordingly, a computer may include one or more processors and, thus, the aforementioned computer system may also include one or more processors. Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), gated logic, and other suitable hardware configured to perform the various functionality described throughout this disclosure.

Additionally, the computer may include one or more memories. Accordingly, the aforementioned computer systems may include one or more memories. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, video tapes, audio tapes, magnetic recording tracks, magnetic tunnel junction (MTJ) memory, optical memory storage, quantum mechanical storage, electronic networks, and/or other devices or technologies used to store electronic content such as programs and data.

In particular, the one or more memories may store computer executable instructions that, when executed by the one or more processors, cause the one or more processors to implement the procedures and techniques described herein. The one or more processors may be operably associated with the one or more memories so that the computer executable instructions can be provided to the one or more processors for execution. For example, the one or more processors may be operably associated to the one or more memories through one or more buses. Furthermore, the computer may possess or may be operably associated with input devices (e.g., a keyboard, a keypad, controller, a mouse, a microphone, a touch screen, a sensor) and output devices such as (e.g., a computer screen, printer, or a speaker).

The computer may execute an appropriate operating system such as LINUX®, UNIX®, MICROSOFT® WINDOWS®, APPLE® MACOS®, IBM® OS/2®, ANDROID, and PALM® OS, and/or the like. The computer may advantageously be equipped with a network communication device such as a network interface card, a modem, or other network connection device suitable for connecting to one or more networks.

A computer may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features of the present disclosure. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and/or the like.

The control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells.

The control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations, and that these terms are merely conventional labels applied to physical quantities that exist within and during operation of the computer based on designed relationships between these physical quantities and the symbolic values they represent.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with some of the teachings described herein. In some embodiments, very specific computing machines, with specific functionality, may be required. Similarly, it may prove advantageous to construct a specialized apparatus to perform the method steps described herein by way of dedicated computer systems with hard-wired logic or programs stored in nonvolatile memory, such as, by way of example, read-only memory (ROM).

In some embodiments, features of the computer systems can be implemented primarily in hardware using, for example, hardware components such as application specific integrated circuits (ASICs) or field-programmable gated arrays (FPGAs). Implementation of the hardware circuitry will be apparent to persons skilled in the relevant art(s). In yet another embodiment, features of the computer systems can be implemented using a combination of both general-purpose hardware and software.

Figure 1A:
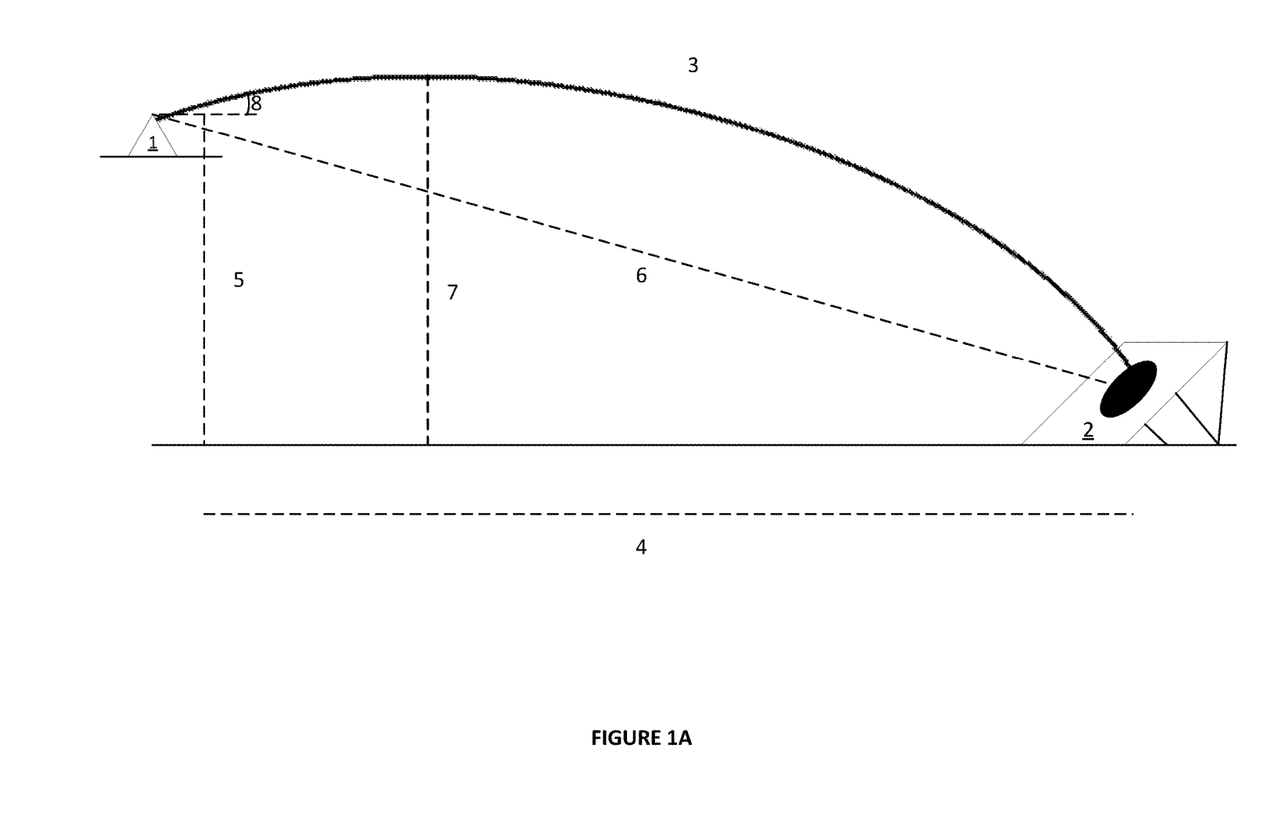
FIGS. 1A and 1B depict a trajectory for a projectile.
Figure 1B:
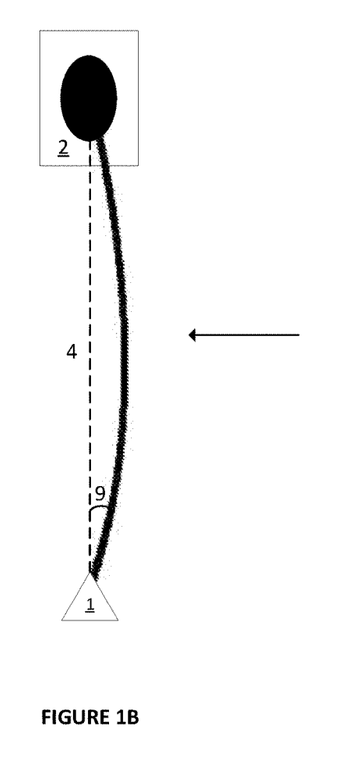
Figure 2:
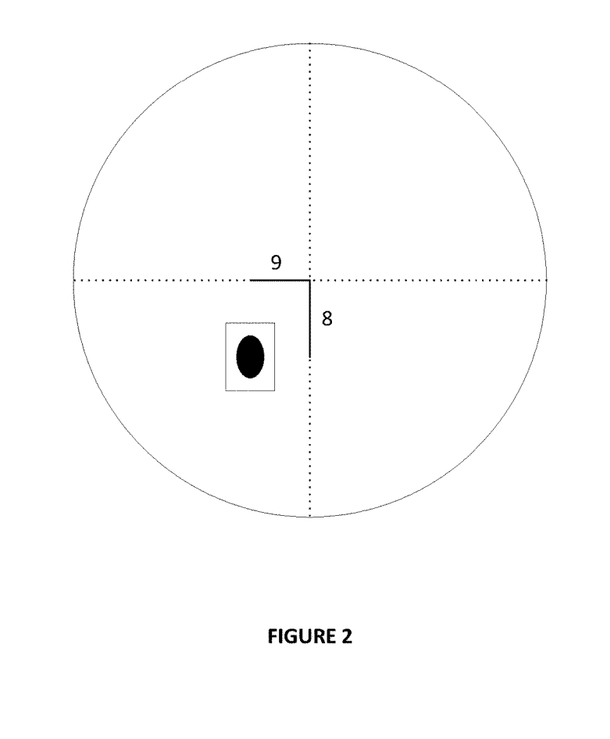
FIG. 2 depicts the sighting of a target using a scope.

FIGS. 1A and 1B depict the typical trajectory 3 of an object in unguided (i.e., ballistic) flight. An object is released or launched from the launch point 1 having a launch speed and heading. As a general matter, the launch heading is aimed higher than the height of the target 2 to account for gravity acting on the object during flight. The angular difference 8 between being level with the horizon and the actual launch heading is known as the elevation angle 8. The launch heading is also directed into the wind so that as the object travels along the trajectory 3, the wind force pushes the object back towards the target. The wind force is shown as the arrow point from right to left in FIG. 1B. The horizontal change in angle 9 to account for the wind force is known as the azimuth angle 9 (also known in some contexts as the windage angle). The launch heading is the combined elevation 8 and azimuth 9 angles. FIG. 2 provides a view of the trajectory from the launch point as may be seen using a scope with crosshairs, showing the elevation 8 and azimuth 9 relative to the target.

FIG. 1 also shows other parameters of the trajectory that may be used in the calculation of a trajectory 3 by a ballistic calculator 60. The horizontal distance from the launch point to the target is the range 4. The vertical distance from the launch point to the target is the elevation 5. The straight-line distance 6 from the launch point to the target is the hypotenuse of a right triangle formed with the elevation 5 and the range 4 as the two shorter sides of the triangle. The highest point that the flying object reaches as it travels along the ballistic flight path from launch point to target is known variously as the apex, apogee, or max ordinate 7.

A wind force is typically provided as a vector having two quantities, a heading (or direction) and a magnitude. For wind, the heading may be given in cardinal directions (e.g., north, south, east, and west); degrees, minutes of arc (moa) or milliradians (mils or mrad) based on absolute direction (e.g., where true north is 0 degrees, east is 90 degrees, south is 180 degrees, and west is 270 degrees); or degrees based on a direction relative to another standard (e.g., 0 degrees is the direction that a person is currently facing, or the direction of a target). Although a magnitude of any given force is typically stated in pounds or newtons, colloquially wind force magnitude is more often stated in terms of the air speed of the wind (e.g., in miles per hour, kilometers per hour, or knots). These respective measurement systems are convertible between each other, and any of combination of them may be used in describing a given wind force vector. Where a wind force heading or magnitude are referenced for use in or with the disclosed systems and methods herein, it is to be understood that these methods of stating or describing the wind force vector as to its heading and magnitude may be depicted or used in any manner as described here or otherwise used in colloquial understanding in a given field or industry.

To determine the wind force along a planned trajectory, a person may first direct an unmanned drone 10 (also known as an unmanned aerial vehicle or UAV) along the general path of the trajectory. In some embodiments, the drone may be a multi-rotor vehicle, such as a quadcopter or octocopter. In other embodiments the drone may be a single-rotor helicopter. In other embodiments the drone may be a fixed-wing drone such as an unmanned airplane. The drone may be capable of vertical take-off and lift (VTOL) flight and hovering capability. The drone may carry cameras or scanning devices 34, which may be used by the operator for various reasons in addition to or in combination with the targeting capabilities described herein.

Figure 3:
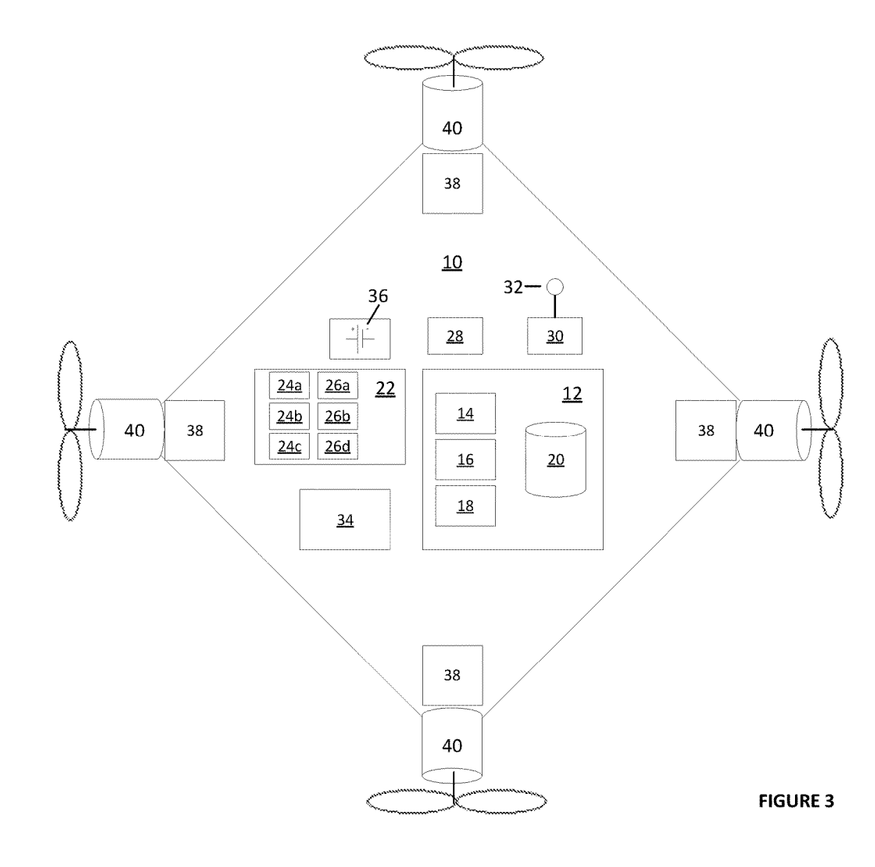
FIG. 3 depicts a schematic showing the elements of a drone.

More particularly, a drone may be a multi-rotor drone 10 such as a quadcopter or octocopter of the kind schematically depicted in FIG. 3. In a multi-rotor drone, each rotor is connected to an individual electrical motor 40.

Additionally, a drone 40 includes a flight controller 12 having a computer processing unit (CPU) 14, memory 16, and hard disk permanent storage 18. The CPU may be augmented by a graphics processor unit (GPU). Alternatively the GPU may in some instances replace a CPU. The flight controller 12 may store software programs or routines that control the operation of the drone and respond to directions provided by the drone operator or information gathered by sensors on the drone 10.

The drone 10 also includes an inertial measurement unit (IMU) 22. An IMU is a package of various types of sensors used to measure and report the angular rate and acceleration of a body. This may be used to determine the location of the body, such as a drone. An IMU usually includes at a set of accelerometers 24 and gyroscopes 26. In a typical IMU, there are three accelerometers 24a, 24b, and 24c configured to determine acceleration in the x-, y-, and z-directions. In addition, a typical IMU includes three gyroscopes 26a, 26b, and 26c configured to determine rotation according to the roll, pitch, and yaw. The IMU sensors are configured to determine the linear and angular acceleration at a particular point in time and provide that information to the flight controller 12. An IMU may also include magnetometers which enable to the IMU to measure the Earth's magnetic field at its location. As such, the magnetometer can act as a digital magnetic compass and provide or augment the determination of the heading of the drone (and in particular the yaw of the drone). The IMU may also be integrated with, or be able to coordinate with, a global positioning system (GPS)-enabled device. For purposes of this application, an IMU is understood to include at least accelerometers and gyroscopes and may include other sensing devices, such as a magnetometer. The IMU may also coordinate with an onboard GPS receiver or system, but the GPS is identified separately from the IMU.

Most drones typically have a GPS satellite receiver 28 for determining the geolocation of the drone and for various applications in drone flight. Other sensors 34 may also be provided in the drone 10. Such sensors may include (but are not limited to) magnetometers, optical sensors, cameras, and sonar sensors or other sound-sensing devices. The flight controller 12 may also include or rely on information provided by other types of sensors in determining the flight direction or providing information back to the operator.

The flight controller 12 also may be connected to a transceiver 30 for receiving instructions on flight direction from a remote controller handled by an operator of the drone, and for communicating information to the operator or the operator's flight control device. The transceiver shown in the embodiment in FIG. 3 is also connected to an antenna 32.

The flight controller 12 and IMU 22 are connected to electronic speed controllers (ESC). An ESC is a modulator that governs the power input provided to a given motor 40. As depicted in FIG. 3, an ESC 38 is provided for each separate motor 40. However, in other embodiments a single ESC 38 may govern the power input provided to all of the motors 40. The ESC 38 may receive instructions from the flight controller 12 to govern the power input to the motor 40. Accordingly, an ESC may have a limited processor for receiving instructions from the flight controller and implementing the power modulation as determined by the flight controller. In other embodiments, if the ESC processor is sufficiently robust to perform complex software routines, the ESC may perform some of the flight controller calculations that would otherwise be performed by the flight controller. It should be understood that such actions and routines performed by the flight controller referenced below may take place specifically on the flight controller processor 14, or they may occur on other processors as designed by the drone manufacturer or operator. For the sake of simplicity, such actions will be referred to as being done by the flight controller below.

Each of the motors 40, ESCs 38, flight controller 12, IMU 22, other sensors 34, GPS receiver 28, and transceiver 30 are powered by an onboard power source such as a battery 36.

Commercially available multi-rotor drones (such as the MAVIC®) can be controlled by the operator to fly along a desired flight path or to hover in the air. To maintain a chosen heading or hover at a location, the flight controller, in reliance on the inertial data provided by the IMU and any additional sensors 34 and/or the GPS receiver 28, senses when it is being moved off the desired heading, such as when being acted upon by a wind force. To counteract the wind force, the flight controller processor 14 is programmed to instruct changes to the electrical power provided to each motor 40, thereby increasing or decreasing the rotor speed. These controls can react very quickly to any new forces, such as variable wind forces along a path.

The flight controller 12 and, by instruction from the flight controller, the ESCs 38 will react in substantially the same manner each time the drone 10 is acted upon by a substantially identical force. For example, a 10 mile-per-hour crosswind blowing perpendicularly to the course heading of the drone 10 will cause the flight controller and associated systems to react by altering the motor power for each rotor to provide a force counteracting the force created by the wind in order to maintain the programmed heading. Thus, by monitoring the speed and heading of the drone 10, and the power input for each electrical motor 40, it is possible to derive the wind force (both its magnitude and direction) acting upon the drone 10. Because the magnitude of the force is directly related to the speed of the wind acting upon the drone 10, the wind speed may also be determined.

Exemplary methods of determining the wind force are described further in X. Xiang, et al., "Wind Field Estimation Through Autonomous Quadcopter Avionics," 2016 *IEEE/ AIAA 35th Digital Avionics Systems Conference (DASC)* (2016), which is incorporated by reference herein. The state information may include the position (i.e., location in a Cartesian plane) and attitude (i.e., the angular orientation of the drone using the Euler angles roll, pitch, and yaw) of the drone, the linear and angular velocity of the drone, and the total thrust created by the torque on each of the 4 rotors of the quadcopter. Other information for determining wind speed may include the mass of the drone and the drag coefficient of the drone. Using this information, the drag force on the drone can be determined using linear algebra techniques such as those described in Xiang et al. Once the drag force is known, the wind speed and heading can be determined. This would be a direct method for determining wind force.

Another method, also described in X. Xiang et al., is to use an iterative Kalman filter to determine the wind speed. There are multiple variations of the Kalman filter, but a basic Kalman filter uses the state information of a system at prior time k−1 to predict the performance of the system at the current time k. The basic equation for a Kalman filter of a system is: $x_k = F_k * x_{k-1} + B_k * u_k + w_k$. The x vector is the state vector for the variables of interest (i.e., wind magnitude and heading) at a given time (i.e., time k or k−1). The matrix $F_k$ is the state transition matrix that applies the system effects to the state vector at the prior time k−1, as such effects occur during the time period that elapses from k−1 to k. The matrix $B_k$ is the control input matrix that applies any control inputs (set forth in vector $u_k$) applied at time k to the system. Vector $w_k$ is the noise vector in order to calibrate the system and counter any noise in the sensors. Other Kalman filter models, including nonlinear models, may also be used.

Other sensors present on the drone, such as the GPS receiver 28, may be used to augment the calculations. For example, relying solely on the accelerometer and gyroscope measurements provided by an IMU 22 may result in inaccurate determinations over time. This is because very small errors in early measurements become compounded as the mathematical determination of location on the basis of inertial measurements alone is iterated hundreds or even thousands of times over time. Even errors within the error tolerance of an accurate and calibrated IMU can result in substantial inaccuracy given a sufficient number of iterations. Accordingly, other sensors such as a visual sensor or magnetometer, or information provided by a GPS transceiver, can be used to augment the inertial sensors and determine a more accurate location for the drone. By accurately determining the drone's location, the wind information that is derived can be accurately mapped to a particular location and used in the ballistics calculator described further below.

Figure 4:
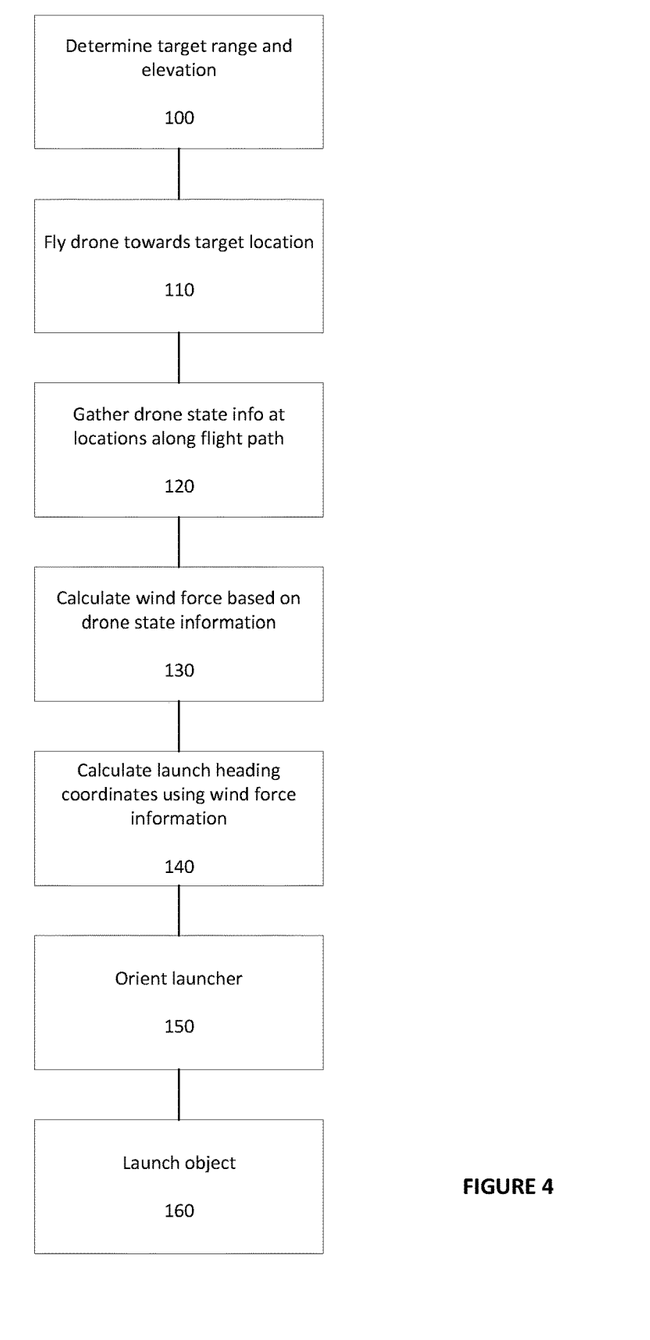
FIG. 4 depicts a process according to an embodiment of the disclosure.

Using the drone state information and drone location, an operator trying to determine the launch heading for launch or release of a flying unguided object may derive the wind speed along an estimated trajectory in the following exemplary manner and as shown in an embodiment process in FIG. 4.

First, an operator or user may determine a target 100 and the target's range and elevation. The target range and elevation are input into a ballistic calculator 60. Target range and elevation may be acquired by any number of means. For example, the target range and elevation may be known to the operator as having already been previously determined, and the operator may input them manually. In other embodiments the target range and elevation may be estimated by the operator and then input manually. In other embodiments the target range and elevation may be obtained by optical measurement, such as by range-finding binoculars. In other embodiments, the target range and elevation may be determined by a laser-sighting device. Where the range and elevation are determined by the use of equipment (e.g., range-finding binoculars or a laser-sighting device), the range and elevation may be communicated directly from the equipment to the processor operating the ballistic calculator using radio, wireless, or other telecommunication technology as is known in the art.

Once the target range and elevation are provided, the operator may direct a drone to fly towards the target location 110. In some embodiments, the drone may flight on a straight-line path from the launch point to the target. In other embodiments, the drone may fly on a vertically curved path to account for the effect of gravity on the intended object to be released. In other embodiments the drone may fly on a horizontally curved path to account for estimated wind effects, which may be done if the wind at the launch point is known or estimated. In other embodiments the drone may fly along the estimated trajectory path or portions of the path more than once, each time iteratively gathering information to evaluate the wind force and progressively get closer to a calculated trajectory path for the flying object. In other embodiments the drone may fly along a subset portion of the path. For example, the drone may fly only as far as the downrange distance of the apex. In other embodiments the drone may fly to a point between the apex and the target, for example, approximately half way between the apex and the target. In other embodiments the drone may fly to a particular location and then hover. Any of these various modes may be determined and entered into the drone flight plan information prior to the drone's take-off. Alternatively the operator may direct the drone manually.

As the drone flies along the selected flight path, the drone processor collects information regarding the state of the drone 120, i.e., drone state information. In some embodiments the drone state information may include the speed and/or acceleration of the drone. In some embodiments the drone state information may include the heading and/or angular velocity or acceleration of the drone. In some embodiments the drone state information may include the power supplied to each motor of the drone. These parameters within the drone state information may be collected individually or in combination with each other or other characteristics.

In some embodiments the drone state information may be sampled periodically. The sample periods may be any desired sampling rate, e.g., on the order of milliseconds, fractions of a second, seconds, or multiple seconds. In other embodiments the information may be gathered based on a determined distance downrange the drone has flown, e.g., every 1 yard, every 5 yards, every 10 yards, every 1 meter, every 5 meters, or every 10 meters, etc. It is understood that a person of skill could select any period or distance interval as desired for sampling the drone state information. In other embodiments the drone state information may be logged continuously.

Drone state information may also be obtained by other means. For example, when the drone flight control system is turned off, not functioning properly, or unable to completely respond to a given wind force (e.g., in very windy conditions), the drone may drift positionally due to wind forces. Positional drift may be determined by GPS receivers. By determining the amount, direction, and/or rate of positional drift over time, the wind speed and direction at a given location can be calculated, similar to the manner set forth herein. Accordingly, in situations where a known heading and speed for the drone cannot be maintained due to either an inactive or malfunctioning ESC system or very high winds, the positional drift from that planned heading can still allow for the determination of wind speed, either alone or in conjunction with the ESC system performance and output.

Therefore, drone state information may also include either an absolute position or a determination of relative change in position or drift over time.

The primary limitation on the amount of drone state information that may be stored or logged is the amount of information that may be stored in the memory or hard drive space on the drone and the rate at which such information may be transmitted to the processor programmed to operate the ballistics calculator.

Next the drone state information is used to calculate the wind speed 143. The wind force calculation may take place at any convenient processor. The drone state information may be used to calculate the wind force at any number of locations between the launch point and the target. The wind force includes at least the wind speed and the heading of the wind at a given location. The processor may determine the wind force at any given range and elevation using the drone state information and the linear algebra or Kalman filter methods described above. Other methods for determining the wind speed from the drone state information may also be used.

In some embodiments the processor may determine the wind force for every five yards or meters from the launch point to the target. Other range intervals may also be used (e.g, every 1 yard, every 10 yards, every 20 yards, every 1 meter, every 10 meters, every 50 meters, etc.). In other embodiments the processor may determine the wind force only for some locations along the flight path as determined by the user. In other embodiments the wind force may be determined only for a subset of the path (e.g., for the portion of the range up to the apex of the flying object).

This particular action may depend on where the processor operating the ballistics calculator is located. In some embodiments the ballistics calculator may be programmed to operate on the processor onboard the drone. In such embodiments the drone state information may be provided immediately to the ballistics calculator for performing the ballistics calculation. In such cases only the launch coordinates or launch heading angles need to be transferred back to the user for implementing the launch heading angles for the object's launch.

In other embodiments the ballistics calculator may be saved to a hard disk space on a personal programmable device accessible to the user. Such a programmable device might be a smart phone, tablet computer, laptop computer, or other mobile device. In these embodiments the drone state information must be transferred from the drone to the ballistics calculator.

In some embodiments the transfer of the information (whether launch heading information or drone state information) may be performed by storing the information on a removable hard disk (e.g., a flash drive, memory stick, or other data storage device), flying the drone back to the launch point, removing the information stored on a removable hard disk, and connecting the removable hard disk to the personal programmable device. In other embodiments the information may be communicated from the drone processor to the personal programmable device by means of a wireless transmission from the drone to the personal programmable device. This may be done by radio transmission, wireless digital transmission, BLUETOOTH® connection, or any other method for conveying information in a wireless manner.

The wind force may then be used by the ballistics calculator to calculate the launch heading, in conjunction with other information supplied by the user (such as range, elevation, drag characteristics of the flying ballistic object, initial speed of the flying ballistic object, planned acceleration or deceleration of the flying ballistic object (e.g., by thrusters, parachutes, sails, or other devices for modifying the velocity of the flying ballistic object for a given period of time), etc.) 140.

Once the ballistics calculator determines a launch heading, the heading is implemented on the launch apparatus for the flying object to orient the launcher to the desired heading 150. In some embodiments this may be performed by the user manually adjusting the elevation and azimuth angles of the launcher. In other embodiments, the launch heading information may be electronically communicated to the launcher, which may automatically orient the launcher to the provided orientation.

Once the launcher is in the orientation provided by the ballistics calculator, the flying object may be released or launched 160.

It will be understood that not all steps need be taken in a given scenario. For example, the drone state information may be supplied directly to the ballistics calculator and a heading determined without the intermediate step of directly determining the wind force magnitude and heading. Also, the drone may have previously gathered information regarding wind force in a general area or region prior to the determination of a particular, specific target. In that case, the operator may rely on the previously provided drone state information rather than determining new drone state information and wind force information by flying the drone after the determination of the target. Other steps may also be modified or optionally omitted in particular circumstances.

Figure 5:
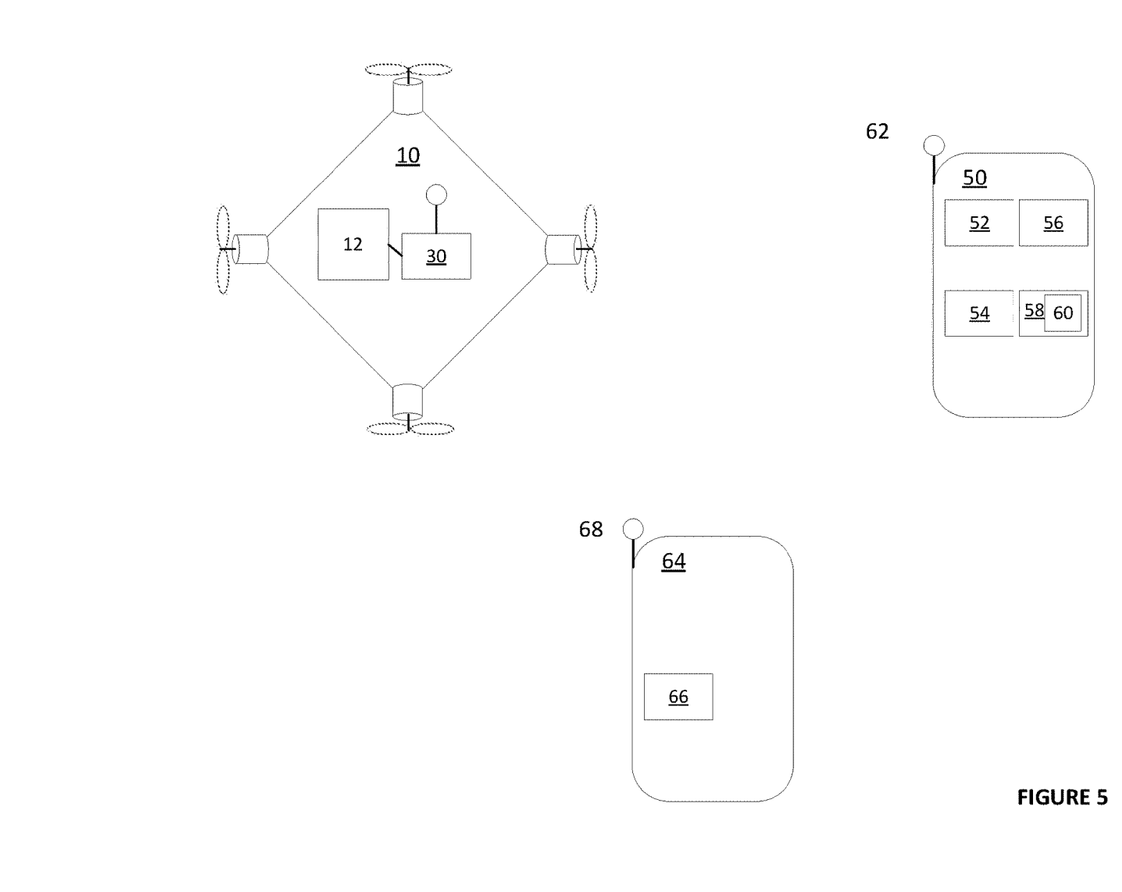
FIG. 5 depicts a system for executing the processes disclosed herein, according to an embodiment of the disclosure.

Systems to perform the above actions are also provided herein and as shown in an embodiment of FIG. 5. In some embodiments, the system may include a drone 10 for obtaining information regarding the wind force along the path. The drone may be a multirotor drone having one motor per rotor. The drone 10 may include a flight controller system 12 for maintaining a desired speed and heading by manipulating the engine power supply in response to forces acting on the drone, e.g., wind forces. The drone 10 further includes ESCs 38 for operating the motors 40 according to the information gathered by the IMU 22 and/or directions provided by the flight controller 12. The processor is programmed to manipulate the motor power supply adjustments based on the information gathered by the flight controller system 12, as described above with reference to FIG. 3.

A ballistics calculator 60 may also be provided. The ballistics calculator is a set of programmed instructions stored on a non-transient media. The ballistics calculator may be stored on the drone hard drive or on a personal programmable device 50. Such a personal programmable device may also include a display 52 for depicting to the user information relating to the drone state information, the wind force, the launch heading, or any other information the drone operator may find relevant, and to allow the operator to perform actions relating to the calculation of the launch heading. The personal programmable device may store the ballistics calculator software instructions in the hard drive disk space 58. The personal programmable device may also include a processor 54 and a memory 56. The personal programmable device may also include a transceiver for communicating with the drone 10 and/or the launcher 64.

A launcher 64 for the object is also provided. The launcher 64 is movable to the calculated launch elevation and azimuth angles. The launcher 64 may be in direct electronic communication with the processor (e.g., by a transceiver 68) performing the ballistics calculator instructions such that the launch coordinates may be communicated to a processor on the launcher 64. The processor 66 on the launcher directs the launcher to the calculated launch coordinates.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

We claim:

1. A method for determining launch heading of an object at a launch location to reach a target, the method comprising:
   providing to a processor a range to the target and elevation to the target;
   flying a drone a first distance on a flight path from the launch location towards the target;
   obtaining drone state information, the drone state information comprising a measurement of electrical power supplied to each motor of the drone for at least two locations along the flight path;
   transmitting the drone state information to a processor programmed to correlate drone state information to wind data;
   calculating wind data from the drone state information, the wind data comprising a wind force vector for the at least two locations along the flight path;
   setting the launch heading of the object in response to the wind data; and
   launching the object.

2. The method of claim 1, wherein the first distance is the distance at which the launched object is expect to be at max ordinate.

3. The method of claim 1, wherein the drone state information further includes a measurement of drift from a given position over time.

4. The method of claim 1 wherein the drone is a multi-rotor aircraft.

5. The method of claim 4, wherein the multi-rotor aircraft is a quadcopter.

6. The method of claim 1 wherein the range and elevation are communicated to the processor from range-finding binoculars.

7. The method of claim 1 wherein the range and elevation are communicated to the processor from a laser-sighting device.

8. A system for determining launch heading of an object to reach a target, the system comprising:
   a drone having an electronic speed control system and a first transceiver capable of transmitting information concerning the electronic speed control system;
   a second transceiver capable of receiving information concerning the electronic speed control system;
   a processor configured to execute instructions to process the information concerning the electronic speed control system to determine a wind speed and heading for at least two locations along an estimated flight path of the object, and further configured to execute instructions to determine the launch heading using the wind speed and headings for the at least two locations; and
   a display to output to a user the launch heading.

9. The system of claim 8 wherein the drone further comprises a positional drift determination system, and wherein the information transmitted from the drone further comprises information concerning the position drift determination system.

10. The system of claim 8 further comprising range-finding binoculars capable of transmitting to the second transceiver a range and elevation to the target.

11. The system of claim 8 further comprising a laser-sighting device capable of transmitting to the second transceiver a range and elevation to the target.

12. A method for obtaining wind data for use by a processor operating a ballistics calculator, wherein the ballistics calculator provides a launch heading for an object located at a launch location and aimed at a target, the method comprising:
   flying a drone a distance on a flight path from the launch location towards the target;
   obtaining drone state information, the drone state information comprising a measurement of electrical power supplied to each motor of the drone for at least two locations along the flight path; and
   transmitting the drone state information to a processor programmed to correlate drone state information to wind data; and
   transmitting wind data to the processor operating the ballistics calculator.

13. A method for obtaining wind data for use by a processor operating a ballistics calculator, wherein the ballistics calculator provides a launch heading for an object located at a launch location and aimed at a target, the method comprising:
   flying a drone a distance on a flight path from the launch location towards the target, wherein the drone comprises an inertial measurement unit;
   using the inertial measurement unit to measure an inertial change comprising either a change in linear acceleration or a change in angular acceleration of the drone;
   transmitting the inertial change to a processor programmed to calculate wind data from the inertial change; and
   transmitting wind data to the processor operating the ballistics calculator.

14. A method for determining launch heading of an object at a launch location to reach a target, the method comprising:

providing to a processor programmed to operate a ballistics calculator a range to the target and elevation to the target;

flying a drone a first distance on a flight path from the launch location towards the target, the drone comprising an inertial measurement unit;

using the inertial measurement unit to measure an inertial change comprising either a change in linear acceleration or a change in angular acceleration of the drone for at least two locations along the flight path;

transmitting the inertial changes to a processor programmed to correlate inertial changes to wind data;

calculating wind data from the inertial changes, the wind data comprising a wind force vector for the at least two locations along the flight path;

setting the launch heading of the object in response to the wind data; and launching the object.

* * * * *